United States Patent
Metz et al.

(10) Patent No.: US 11,604,677 B2
(45) Date of Patent: Mar. 14, 2023

(54) DATA SET SUBSCRIPTION TRACKING AND TERMINATION SYSTEM

(71) Applicant: Bank of America Corporation, Charlotte, NC (US)

(72) Inventors: Daniel Metz, Sleepy Hollow, NY (US); David Malament, Concord, NC (US); Prasad Dasari, Charlotte, NC (US); Jeff L. Howard, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/857,088

(22) Filed: Jul. 4, 2022

(65) Prior Publication Data
US 2022/0334872 A1     Oct. 20, 2022

Related U.S. Application Data

(63) Continuation of application No. 16/858,780, filed on Apr. 27, 2020, now Pat. No. 11,422,855.

(51) Int. Cl.
*G06F 9/54* (2006.01)
*G06F 9/48* (2006.01)
(Continued)

(52) U.S. Cl.
CPC ............ *G06F 9/4881* (2013.01); *G06F 9/451* (2018.02); *G06F 9/542* (2013.01); *G06F 16/27* (2019.01)

(58) Field of Classification Search
CPC ........... G06F 9/541; G06F 9/542; G06F 9/546
(Continued)

(56) References Cited

U.S. PATENT DOCUMENTS 7,533,128 B1    5/2009  Sanchez et al.
8,380,787 B2    2/2013  Anand et al.
(Continued)

OTHER PUBLICATIONS

"Apache Nifi: An Easy to Use, Powerful, and Reliable System to Process and Distribute Data," https://nifi.apache.org/, The Apache Software Foundation, 2018.
(Continued)

*Primary Examiner* — Andy Ho
(74) *Attorney, Agent, or Firm* — Weiss & Arons LLP

(57) ABSTRACT

A data set subscription tracking and termination system may include a distribute module, a publisher and a plurality of subscribers. The distribute module may receive a publication registration to register a publication. The distribute module may receive a subscription registration to register a subscription to the publication. The publication registration and/or subscription registration may include metadata relating to the publication and/or subscription. A metadata store, included in the distribute module, may store the publication registration and/or the subscription registration. The publisher may change the publication. The change to the publication may include adding and/or deleting rows and/or columns to, or from, the publication. The publisher may notify the distribute module of publication. The distribute module may transmit an alert to all subscribers notifying them of the publication changes. The distribute module may also terminate subscriptions that only include data elements that are deleted from the publication.

13 Claims, 9 Drawing Sheets

(51) Int. Cl.
 *G06F 16/27* (2019.01)
 *G06F 9/451* (2018.01)
(58) Field of Classification Search
 USPC .......................................... 719/313, 318, 328
 See application file for complete search history.

(56) References Cited

U.S. PATENT DOCUMENTS

| | | |
|---|---|---|
| 8,601,029 B2 | 12/2013 | Anand et al. |
| 8,788,815 B1 | 7/2014 | Garcia et al. |
| 8,930,331 B2 | 1/2015 | McGrew et al. |
| 9,292,575 B2 | 3/2016 | Bose et al. |
| 9,607,063 B1 | 3/2017 | Cao et al. |
| 9,817,877 B2 | 11/2017 | Taranov |
| 10,120,904 B2 | 11/2018 | Ranganathan |
| 10,171,635 B2 | 1/2019 | Alves et al. |
| 10,205,767 B2 | 2/2019 | Lee et al. |
| 10,248,810 B2 | 4/2019 | Bisaga |
| 10,452,625 B2 | 10/2019 | Mukherjee et al. |
| 10,997,000 B1 | 5/2021 | Meyers |
| 11,429,669 B2 * | 8/2022 | Renjith .................. G06F 9/542 |
| 2015/0163160 A1 | 6/2015 | Lawrence et al. |
| 2019/0149498 A1 | 5/2019 | Lieu |
| 2021/0176324 A1 | 6/2021 | Shetty et al. |

OTHER PUBLICATIONS

"Autosys Tutorials: Autosys Quick Reference," http://autosys-tutorials.blogspot.com/2011/04/autosys-quick-reference.html, Retrieved on Feb. 20, 2020.
"Apache NiFi," https://en.wikipedia.org/wiki/Apacbe_NiFi, Wikimedia Foundation, Inc., Nov. 12, 2019.

\* cited by examiner

DATA SET SUBSCRIPTION TRACKING AND TERMINATION SYSTEM

CROSS-REFERENCE TO RELATED APPLICATION

This application is a continuation of U.S. patent application Ser. No. 16/858,780 filed on Apr. 27, 2020, now U.S. Pat. No. 11,422,855 and entitled "DATA SET SUBSCRIPTION TRACKING AND TERMINATION SYSTEM" which is hereby incorporated by reference herein in its entirety

FIELD OF TECHNOLOGY

This disclosure relates to data set monitoring.

BACKGROUND OF THE DISCLOSURE

Entities may include numerous systems and subsystems. These systems and subsystems may be used to perform routine functions. The systems and/or subsystems may include databases, computer applications, computer platforms, network servers, network applications and other suitable systems and/or subsystems.

Many times, within an entity, there are requests, requirements and/or obligations, to transfer data from a first system to one or more other systems. Conventionally, these data transfers have been executed by custom-written software scripts. Therefore, for each data transfer, a custom software script must be written and executed. It should be appreciated that custom script writing is both time-consuming and resource-consuming. Because each script must be customized for the particular transfer for which it is used, these scripts are typically error-prone.

In addition, many entities have data governance and data provenance requirements. For the purposes of this application, data governance may be understood to refer to an identification of which sub-entity is responsible, or which sub-entity owns, a predetermined data set at a predetermined point in time and/or at a predetermined location. For the purposes of this application, data provenance may be understood to refer to the data lineage—i.e., where a predetermined data set originated from, and where the predetermined data set was located since the generation of the predetermined data set.

In order to comply with these data governance and data provenance requirements, entities may include data governance and/or data provenance databases. Conventionally, there may be multiple data governance and/or data provenance databases. Each of the data governance and/or data provenance databases may be required to access each custom-scripted data transfer in order to retrieve the data governance and/or data provenance data.

As discussed above, these custom scripted data transfers may be error-prone, and therefore, the data governance and/or data provenance data may be error-prone as well. Additionally, because of the large volume of data transfers within an entity, custom-written scripts that facilitate each custom scripted data transfer may be cumbersome as well as error-prone. Furthermore, keeping the data governance/data provenance aspect synchronized with the data transfer may be complex.

Therefore, it would be desirable for a data transfer system that centralizes data movement between systems. Such a data transfer system would preferably eliminate the need to write custom scripts for data set transfers. Furthermore, such a data transfer system would enable multiple subscribers to subscribe to data sets published by a single data publisher.

It would be further desirable for the data transfer system to perform both data governance and data provenance. Such a data transfer system may keep track of who owns the data as well where the data traveled.

It would be further desirable to enable data governance and/or data provenance systems to access the data from the centralized system. Such a data transfer system may eliminate the need for data governance and/or data provenance systems to access multiple individual data transfers.

It would be yet further desirable to enable a data set subscription tracking and termination system. Such a data set subscription tracking and termination system may notify subscribers about data as it becomes available from publishers. Such a data set subscription tracking and termination system may also terminate subscriptions that become obsolete. Obsolete subscriptions may only include data that has been removed by the publisher.

SUMMARY OF THE DISCLOSURE

A system for data set subscription tracking and termination system is provided.

The system may include a distribute module. The distribute module may include a user interface. The distribute module may include a first application programming interface. The first application programming interface may be an application programming interface written in any suitable programming language. The first application programming interface may also be referred to as a distribute application programming interface.

The distribute application programming interface may communicate with the user interface. The distribute application programming interface may execute the backend processing for the user interface.

The distribute module may also include a distribute module database. The distribute module database may communicate with the distribute application programming interface. The distribute module database may include a metadata store.

The distribute module may also include a data engine. The data engine may include a data engine application programming interface. The data engine application programming interface may be a second application programming interface. The data engine may also include a publisher flow application. The publisher flow application may communicate with the data engine application programming interface. The data engine may also include a subscriber flow application. The subscriber flow application may communicate with the publisher flow application.

The system may also include a publisher. The publisher may include a job scheduler. The job scheduler may trigger the publishing of one or more publications. A publication may be a time-based snapshot of data that may be retrieved, by the distribute module, from the publisher's datastore. The publisher's datastore may be a database, file system, data platform or any other suitable data storage location. The publishing of the one or more publications may include publishing one or more links to the one or more publications. The publisher may also include a publisher datastore. The publisher datastore may include the one or more publications.

The system may also include a subscriber. The subscriber may include a subscriber server. The subscriber server may receive the one or more publications.

In some embodiments, the system may include a plurality of subscribers. Each subscriber, included in the plurality of subscribers, may include a subscriber server. Each subscriber may register a subscription to at least one of the one or more publications. During the subscription registration, each subscriber may select at least one of the one or more publications. Also, during the subscription registration, each subscriber may be provided the option to customize the subscription of the selected publications. The customizing may include selection and/or deselection of one or more tables, columns and/or rows within the selected publications. As such, when the one or more publications are published, each subscriber may receive a customized version of the selected publications. The customized version may also be referred to herein as a predetermined subset of a publication. A predetermined subset of a publication may be specified by a subscriber.

The job scheduler may trigger the publishing of a publication, included in the one or more publications, by calling an endpoint on the distribute application programming interface. The calling may include transmitting a unique identifier from the job scheduler to the distribute application programming interface. The unique identifier may be generated for the publication when the publication is registered. The unique identifier may be generated by the distribute module database when the publication is registered. The unique identifier may be stored in the metadata store included in the distribute module database. The unique identifier may also be stored in the distribute module database external to the metadata store. The unique identifier may also be stored in the distribute application programming interface. The unique identifier may also be stored in the publisher datastore.

The distribute application programming interface may retrieve publisher metadata and subscriber metadata from the metadata store included in the distribute module database. The publisher metadata may relate to the act of publication. The publisher metadata may relate to the data included within the publication itself. The publisher metadata may include a location of the publication. The location of the publication may be a predetermined location within the publisher datastore.

The subscriber metadata may relate to the subscriber. The subscriber metadata may include a location operable to receive the publication.

In certain embodiments, when multiple subscribers subscribe to a single publication, the subscriber metadata may include the plurality of subscribers. In such embodiments, the subscriber metadata may include metadata relating to each of the subscriber's customized version of the subscription. As such, the subscriber metadata may include, for each subscriber, the predetermined subset of the publication as specified by the subscriber.

The distribute application programming interface may combine the publisher metadata and the subscriber metadata into one metadata payload. The distribute application programming interface may transmit the one metadata payload to the data engine application programming interface.

The data engine application programming interface may transmit the one metadata payload to the publisher flow application. The publisher flow application may retrieve the publication to be published from the publisher datastore. The retrieval may be based on the one metadata payload.

The publisher flow application may transmit the retrieved publication and the one metadata payload to the subscriber flow application. The one metadata payload may be used to filter the retrieved publication based on custom subscriber request.

A user may setup customization of the publication at either the publisher flow and/or the subscriber flow. In some embodiments, the publisher flow may filter and/or customize the publication. In certain embodiments, the subscriber flow application may filter and/or customize the publication for the subscriber based on the subscriber metadata included in the one metadata payload. In embodiments where multiple subscribers subscribe to one publication, the subscriber flow application may filter and/or customize the publication for each subscriber included in the plurality of subscribers. The filtering and/or customization may be based on the subscriber metadata included in the one metadata payload.

The subscriber flow application may transmit the filtered publication to the subscriber server. In embodiments where multiple subscribers subscribe to a single publication, a customized version of the publication, or predetermined subset of the publication as specified by the subscriber, may be transmitted to each subscriber server.

A publisher may change or alter the publication. Such changes may include adding one or more data elements, tables, rows and/or columns to the publication. Such changes may also include deleting one or more data elements, tables, rows and/or columns from the publication.

In some embodiments, the publisher may transmit a message to the distribute module. The message may include data relating to the change to the publication. In certain embodiments, the job scheduler may trigger the message transmission to the distribute application programming interface. The message may be triggered upon the identification of the change within the publication.

In some embodiments, the distribute module may scan the publication to determine any changes made to the publication. The publication scan may be executed on a predetermined schedule, such as daily, weekly or monthly. The publication scan may also be executed a predetermined amount of time prior to the publishing of the publication.

Upon determination of a change to the publication, the distribute application programming interface may retrieve publisher metadata and subscriber metadata from the metadata store included in the distribute module database. The distribute application programming interface may generate an alert relating to the change to the publication. The alert may include details relating to the change to the publication. As such, the alert may include the one or more data elements, rows, columns and/or tables to be added and/or deleted to, or from, the publication.

The alert may be transmitted to the subscriber. In some embodiments, the alert may be transmitted from the distribute application programming interface to the data engine application programming interface. The data engine programming interface may transmit the alert to the subscriber flow application. The subscriber flow application may transmit the alert to the subscriber.

The alert may be an actionable alert. The alert may include a selectable option to select one or more of the one or more data elements, rows, columns and/or tables to be added to the publication. Upon selection, by the subscriber, of the selectable option to select one or more of the one or more data elements, rows, columns and/or tables to be added to the publication, the actionable alert may be re-transmitted to the distribute module database. In some embodiments, the actionable alert may be re-transmitted via the subscriber flow application, the data engine application programming interface and the distribute application programming interface. The distribute module database may store the selection made by the subscriber, using the selectable option, within the subscriber metadata in the metadata store.

In embodiments where multiple subscribers subscribe to one publication, the distribute application programming interface may determine a subset of subscribers that subscribe to the publication. The subset of subscribers may have only subscribed to data elements within the publication that are scheduled to be removed from the publication. In such embodiments, the actionable alert may alert the subscribers of the subscription termination based on the publisher's change to the publication. The actionable alert may provide the subset of subscribers the ability to subscribe to other metadata elements included in the subscription.

Upon termination of a subscription, the distribute application programming interface may delete subscriber metadata associated with the terminated subscriptions from the metadata store.

In some embodiments, the actionable alert may be transmitted to subscribers via the user interface and/or a dashboard. The actionable alert may provide the subscriber the ability to terminate the subscription even in the event that data elements included in the subscription are still being published.

It should be appreciated that, in some embodiments, the actionable alert may only be provided to subscribers that are impacted by the change to the publication. Subscribers that are not impacted by the change to the publication may not be alerted. An example of such a change may be deletion of a column to which a subscriber has not subscribed.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
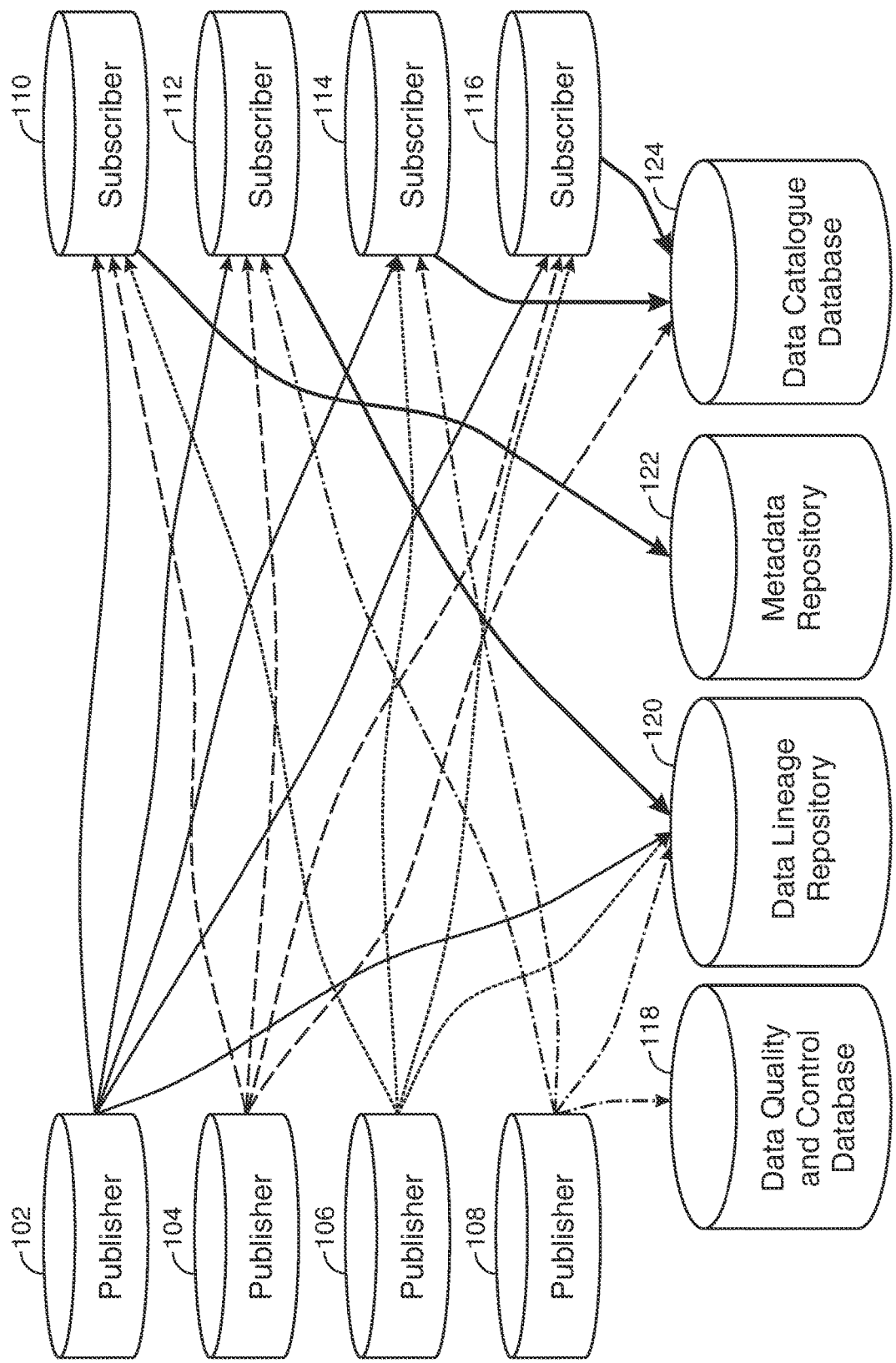
FIG. 1 shows an illustrative prior art diagram.

A method for data set subscription tracking and termination system is provided. The method may include receiving a request to register a publication. The request may be received from a publisher. The request may be received at a user interface. A distribute application programming interface may command, or provide the backend for, the user interface.

The method may include displaying a plurality of database and/or connection questions at the user interface. The method may include receiving a set of responses to the plurality of database and/or connection questions. The receiving may be implemented at the user interface.

The method may include fetching, from a datastore linked to the publisher, a list of tables, columns and rows included in the publication. The method may include presenting the list of tables, columns and rows to the publisher via the user interface.

The method may include receiving a selection of a list of tables, columns and rows to be published. The selection may be received at the user interface. The selected list of tables, columns and rows to be published may be a subset of the publication. The selected list of tables, columns and rows to be published may be the entirety of the publication.

The method may include receiving a registration confirmation from the publisher via the user interface. The method may include transmitting a set of publication metadata to a metadata store upon receipt of the registration confirmation. The metadata store may be included in a distribute database. The transmitting may be via a distribute application programming interface. The set of publication metadata may include the set of responses and the selection of the list of tables, columns and rows. The set of publication metadata may also include a location of where the publication may be retrieved. Such a location may be a database address within a database linked to the publisher.

A unique identifier may be generated for a publication upon receipt of the registration confirmation from the publisher. The set of publication metadata may also include the unique identifier. The unique identifier may be used to retrieve the publication metadata when the publication is published. The unique identifier may also be transmitted from the distribute module to the publisher. The publisher may store the unique identifier within a job scheduler and/or a database linked to the publisher.

In some embodiments, the interactions between the publisher and the user interface may be implemented directly between the publisher and the distribute application programming interface. Such interactions may be batch interactions or other such interactions.

The method may include receiving a request to subscribe to the publication. The request may be received at the user interface. The method may include displaying the set of publication metadata to the subscriber. The displaying may be via the user interface.

The method may include receiving, from the subscriber, a selection of one or more tables, columns and/or rows from the set of publication metadata. The selection may be received at the user interface.

The method may include receiving a subscription confirmation from the subscriber via the user interface. Upon receipt of the registration confirmation from the subscriber, the method may include transmitting a set of subscription metadata to the metadata store via the distribute application programming interface. The set of subscription metadata may include a subscriber datastore location. The subscriber datastore location may be a location, included on a subscriber server or datastore, that is operable to receive the publication. The set of subscription metadata may include the selection received from the subscriber.

The method may include triggering the publishing of the publication by calling an endpoint the distribute application programming interface. A job scheduler may execute the triggering. The job scheduler may be located at a publisher location. The calling may include transmitting the unique identifier from the job scheduler to the distribute application programming interface.

The method may include retrieving the set of publication metadata and the set of subscription metadata from the metadata store. The distribute application programming interface may execute the retrieving.

The method may include combining the set of publication metadata and the set of subscription metadata in a metadata payload. The metadata payload may be a single metadata payload or a plurality of metadata payloads.

The method may include transferring the metadata payload from the distribute application programming interface to a data engine application programming interface. The method may include identifying the publisher at the data engine application programming interface. The publisher identification may be based on the metadata payload.

The method may include the data engine application programming interface calling the publication flow application. The calling may include transferring the metadata payload to the publication flow application. The method may include using the metadata payload at the publication flow application to retrieve the publication from the database linked to the publisher.

The method may include transmitting the publication and the set of subscription metadata from the publication flow application to a subscription flow application. The method may include customizing the publication into a subscriber-customized publication at the subscription flow application. The customizing may be based on the set of subscription metadata. It should be appreciated that, in the event that multiple subscribers subscribe to a single publication, each subscriber may have its own subscriber metadata. As such, the subscriber flow application may customize the publication for each subscriber.

The method may include transmitting the subscriber-customized publication from the subscription flow application to a server associated with the subscriber. Also, in the event that multiple subscribers subscribe to a single publication, each customized subscription may be transmitted to the appropriate subscriber server.

It should be appreciated that multiple publications and/or multiple subscriptions may be stored within the metadata store of the distribute module. As such, the distribute module may maintain records of the various publications and/or subscriptions within an entity. The distribute module may identify a publication, subscribers that subscribe to the identified publication and a history of the data transfer between a publisher and a subscriber. As such, the distribute module may maintain records of the datastores that were traversed between the publisher and the subscriber. For example, publication A originates in datastore A within publisher A's domain and is transferred to datastore G within subscriber G's domain, via datastores N, H, K and the distribute module. This metadata relating to the transfer of a publication—i.e., publication A is transferred from datastore A to datastore G via datastores N, H and K—may be stored within the distribute module. This metadata relating to the transfer of the publication may also be used when determining lineage, governance and/or provenance of a data set.

This metadata relating to the transfer of the publication may also be used to perform data localization. Data localization may ensure that a publication moves through a specific set of datastores and/or servers from the source location to the target location. This is notable when a publication is required to be maintained within specific boundaries, such as country borders.

The data engine application programming interface, the publication flow application and the subscription flow application may be included in a data engine. The user interface, the distribute application programming interface and the distribute database may be external to the data engine. The method may include accessing the data engine by a plurality of data provenance, data governance and data movement databases. The accessing may be in order to retrieve data relating to data movement of the publication. Such data relating to data movement may include the datastores that were traversed between the publisher and the one or more subscribers.

It should be appreciated that, because the system provides both data movement and data lineage capture, such a system may provide provable data lineage on an element basis in addition to a publication basis. For example, the data engine may provide traceable lineage for each element included in each publication.

The data engine may also perform data checking on the publication to ensure the completeness of the publication transfer. As such, the data engine may count tables, columns and/or rows within the publication when the publication is retrieved. The data engine may also count tables, columns and/or rows within the publication as the publication is transferred to the subscriber.

The data engine may check to ensure that the retrieved publication was transferred in its entirety.

The data engine may also provide the data transfer capabilities; however, the data engine may not change the publication because the data engine may not be the originator, or own, the publication.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative prior art diagram. Publishers 102, 104, 106 and 108 publish data sets. Subscribers 110, 112, 114 and 116 subscribe to one or more data sets published by publishers 102-108. For example, publisher 102 publishes a data set that is consumed by subscribers 110, 112, 114 and 116. Publisher 104 publishes a data set that is consumed by subscribers 110, 112 and 116. Publisher 106 publishes a data set that is consumed by subscribers 110, 114 and 116. Publisher 108 publishes a data set that is consumed by subscribers 112 and 114.

It should be appreciated that some subscribers request an entire publication, while other subscribers request a subset of the same publication. As such, each subscriber does not request the same rows and/or columns of the data sets published by publishers 102-108. Therefore, a custom-written script is written, either on the publisher side, or on the subscriber side, for each data set transfer. The custom-written script, among other actions, transfers the published data set to each subscriber.

Also, even if the data is the same for multiple subscribers, at times, each data set transfer utilizes an individual custom-written script.

Databases 118, 120, 122 and 124 are data governance and/or data provenance databases. Each of databases 118-124 are responsible for some type of data governance and/or data provenance within the entity. Databases 118-124 are internal governance platforms that are responsible for metadata and data lineage. Databases 118-124 are an official location where system to system data is required to be published.

Database 118 is a data quality and control database. Database 118 stores metadata for data quality checking. Database 118 is a data control tool. Database 118 runs checks to ensure that data is fit for the entity. Database 118 checks that the data in a report is accurate.

Database 120 is a data lineage repository. Database 120 is a metadata repository that includes data lineage. Database 122 is a metadata repository.

Database 124 is a data catalogue database. A data catalogue is a location where a system within the entity can publish data definitions. Database 124 is also known as a target metadata repository as well.

Because databases 118-124 are data governance and/or data provenance databases, databases 118-124 access, in order to document data lineage, data transfers between publishers 102-108 and subscribers 110-116. Publishers 102-108 transfer data lineage relating to the data set transfers to databases 118-124. Subscribers 110-116 transfer data lineage relating to data set transfers to databases 118-124. Databases 118-124 directly access and/or intercept the data set transfers to retrieve data lineage relating to data set transfers.

For example, publisher 102 transfers a data set to subscribers 110-116. Data lineage relating to each of the data set transfers is communicated directly to each of databases 118-124. As such, between eight and twenty different custom-written scripts are written in order to retrieve data lineage data relating to the data set transfers. The exact number of custom-written scripts depends on which databases access the communications as well as how the communications are accessed—i.e., via the publisher, the subscriber or directly with the data set transfer.

As described in connection with FIG. 1, conventionally, there are numerous custom-written scripts that are required to ensure data set transfer and data set transfer data lineage documentation. Even so, the process is both error-prone and consumes large amounts of resources. Therefore, such a system is inefficient.

Figure 2:
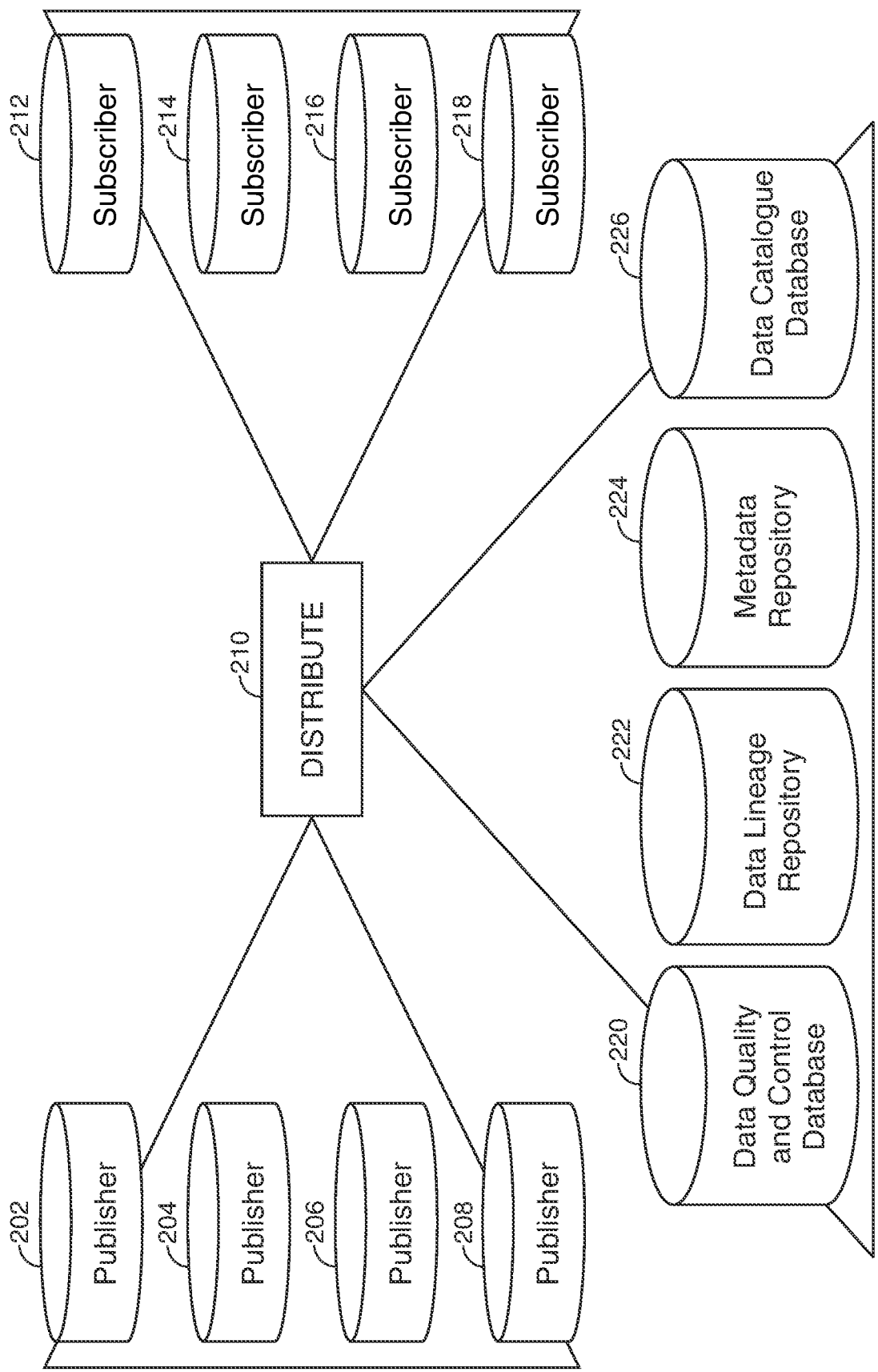
FIG. 2 shows an illustrative diagram in accordance with principles of the disclosure.

FIG. 2 shows an illustrative diagram. The illustrative diagram may include communications between publishers, subscribers and databases using distribute module 210. Distribute module 210 sits in between publishers 202-208 and subscribers 212-218.

Publishers 202-208 may publish their data. Distribute 210 may retrieve the data and transmit the data, or a subset of the data, to the appropriate subscribers 212-218. In addition, databases 220-226 may access distribute module 210 in order to retrieve metadata including data governance and/or data provenance data relating to the published data sets.

Figure 3:
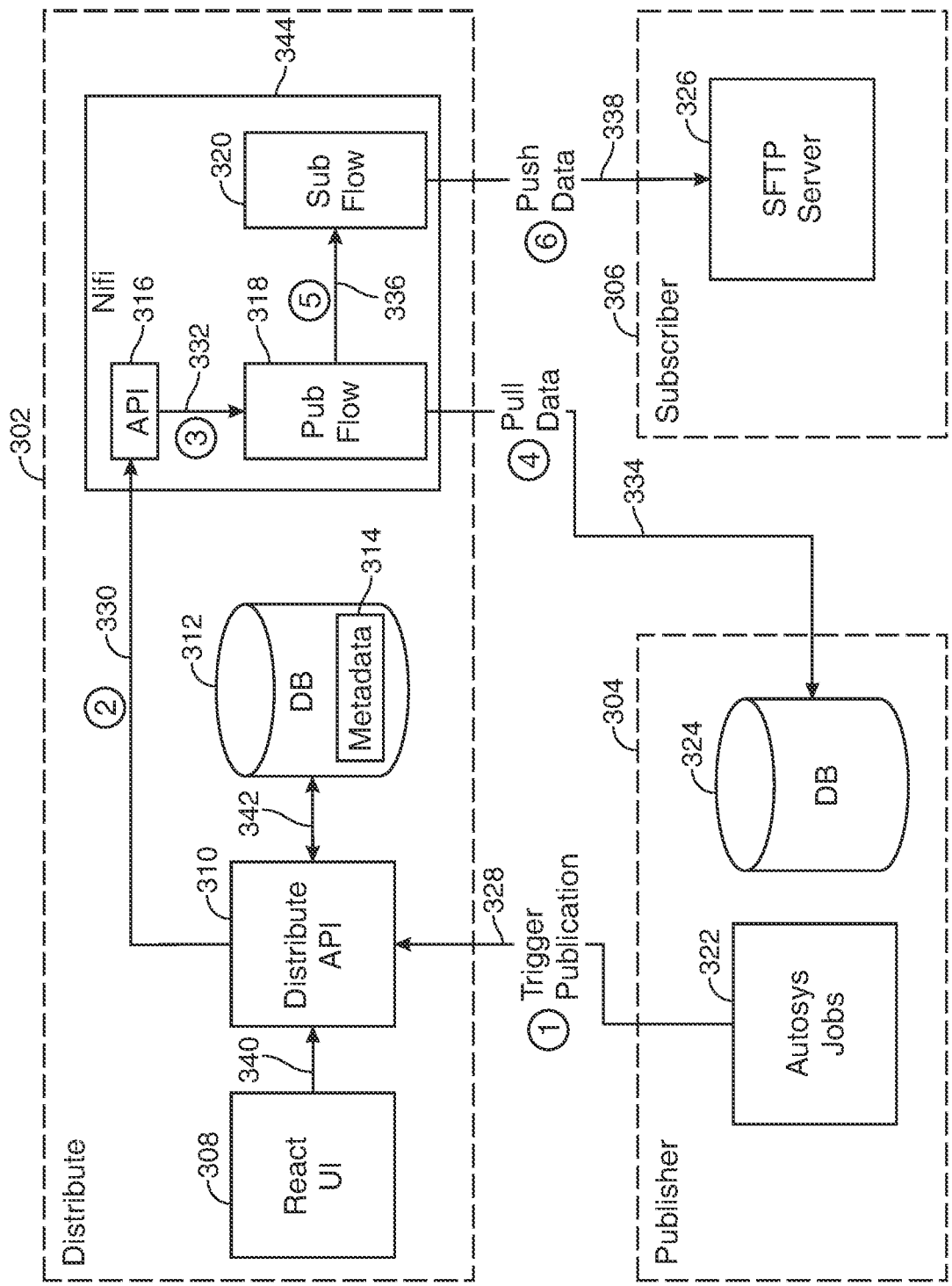
FIG. 3 shows another illustrative diagram in accordance with principles of the disclosure.

FIG. 3 shows an illustrative diagram. Distribute module 302 may interact with publisher 304 and subscriber 306. Although one publisher and one subscriber are shown in FIG. 3, it should be appreciated that multiple publishers and multiple subscribers may utilize distribute module 302.

Distribute module 302 includes react user interface ("UI") 308. React UI 308 may be a user interface that enables publishers and/or subscribers to register, or subscribe to, a publication.

A publisher, such as publisher 304, may register a publication. When registering a publication, react UI 308 may present a publisher with a list of questions about the publication in order to register the publication. The list of questions may include questions relating to connection details and database details. Connection details and database details may include details relating to a connection to a source or target system. The source or target system may be a database, a secure file transfer protocol ("SFTP") server, a Kafka™ topic, a Hadoop™ cluster or other suitable system. Connection properties may include a connection uniform resource locator ("URL"), a port number, a username and/or a password. The list of questions may also include details relating to the publication schedule—i.e., the frequency of publication.

Distribute module 302 may receive details relating to the publication. Upon receipt of the details relating to a particular publication, distribute module 302 fetches, from the database included in the publisher, a list of tables included in the publication as well as a list of columns and rows included in each table. A process within Nifi™ 344 may execute the fetching. The list of tables as well as the list of columns and rows may be presented to the publisher. The publisher may be presented, within react UI 308, the functionality to select one or more tables to be published. The publisher may also be presented, within react UI 308, the functionality to select columns and/or rows within the table to be published. The publisher may also be presented, within react UI 308, the functionality to select/deselect column/row filters for the publication.

Upon receipt of a confirmation from the publisher, the metadata, relating to the publication, may be transmitted to distribute application programming interface ("API") 310 via communication 340. Distribute API 310 may transmit the metadata, relating to the publication, to database ("DB") 312 via communication 342. Database 312 may store the metadata, relating to the publication, within metadata store 314. Metadata store 314 may be included in DB 312. It should be appreciated that DB 312 may be a datastore, file system or any other suitable data storage platform.

A subscriber, such as subscriber 306, may subscribe to a publication. When subscribing to a publication, react UI 308 may present a subscriber with a list of questions about the subscription in order to register the subscription. The list of questions may include subscriber scheduling questions. As such, a subscriber may receive the publication on a different scheduler that what was published by the publication.

The subscriber may subscribe to a publication by selecting the publication. The subscriber may select the publication from a list of available publications. The subscriber may select the publication by entering publication data into a subscription data entry field on react UI 308.

Upon a subscriber's selection to a particular publication, react UI 308 may present to the subscriber the particular tables, columns and/or rows that are being published from this publication. The subscriber may select the entire publication and/or a subset of tables, columns and/or rows. The subscriber may also filter the publication in order to receive a subset of the publication. For example, a publication may include five products. A subscriber may request data relating to one of the five products. Therefore, a filter may be instituted so that the subscriber receives data relating to the one product.

It should be appreciated that, although the subscriber filters the subscription to the publication, the publication is not altered in any manner. As such, a publication may be published one time and many subscribers may receive various subsets of the publication without interfering with the publication or the publisher. Therefore, the publication may have a one-to-many relationship with a subscription—i.e., one publication may satisfy multiple subscriptions.

Upon receipt of a confirmation from the subscriber, the metadata, relating to the subscription, may be transmitted to distribute application programming interface ("API") 310 via communication 340. Distribute API 310 may transmit the metadata, relating to the subscription, to database ("DB") 312 via communication 342. Database 312 may store the metadata, relating to the subscription, within metadata store 314. Metadata store 314 may be included in DB 312.

It should be appreciated that, upon registration of a publication and/or subscription, data has not yet been transferred from a publisher to a subscriber. Data may be transferred when the publication is published.

It should be yet further appreciated that the publisher may own the data included in the publication as well as a schedule of when the publication is published. Therefore, publisher 304 may trigger the publishing of a publication. A publication may be ready to be published when all of the processes and extract, transform and load ("ETL") jobs have been completed.

When publisher 304 determines that a publication is in a state to be published, a job scheduling command, such as an Autosys™ command, may trigger the running of the publication. The job scheduling command may trigger publication, as shown at 328, by calling an endpoint on distribute API 310. The call may include a unique identifier that was generated for the publication that was previously set up using react UI 308. The call may state that the publisher is ready to trigger the publication. Distribute API 310 pulls the metadata for the publication from metadata store 314. Distribute API 310 also pulls the metadata for the subscribers of the publication from metadata store 314. Distribute API 314 combines the metadata, relating to the publication and the publisher, and the metadata, relating to the publication and the one or more subscribers, into one payload of metadata.

The payload of metadata may be transmitted from distribute API 310 to API 316, via communication 330. API 316 may be included in Nifi™ 344. Nifi™ 344 may be included in distribute module 302. Nifi™ 344 may be an open source data engine by Apache™. Nifi™ 344 may responsible for the actual data transfer from one location to another location. Nifi™ 344 may also be responsible for performing the data filtering.

API 316 receives the payload of metadata, identifies the publisher and calls publication flow 318 via communication line 332. Publication flow 318 uses the metadata received about the publication, and therefore, identifies which datastore to access and which tables/rows/columns to retrieve. Publication flow 318 accesses database 324 and retrieves the identified data set. At this point, the data set exists in Nifi™ 344.

Publication flow 318 transmits the data set to subscriber flow 320 via communication 336. Together with the data set, publication flow 318 also transmits metadata about the one or more subscriptions. Subscriber flow 320 may use the received metadata in order to customize the data set for each subscriber. Such customization may include filtering the data set. Such customization may also include identifying and naming files appropriately. Such customization may also include, for delimited data sets, identifying, and altering, as necessary for the subscriber, a delimiter that is included within the data set. Such customization may also include enabling a subscriber to receive data in any requested format. A publication may be published in a Hadoop™ format, a Kafka topic™ format, a structured query language ("SQL")™ format, a text file, a file transfer protocol ("FTP") server format or any other suitable data storage format on any suitable data storage platform. Such a publication may be received at the subscriber in any requested format. The requested format may be a Hadoop™ format, a Kafka™ topic format, a structured query language ("SQL")™ format, a text file, a file transfer protocol ("FTP") server format or any other suitable data storage format on any suitable data storage platform. As such, the data engine may mediate between various platforms, such as Hadoop™, Kafka™, SQL™, text files and FTP servers.

It should be appreciated that react UI 308 may generate recipes within Nifi™ data engine 344 at the time of registering the data set based on what is published by the publisher and what is subscribed to by the one or more subscribers. The generated recipes may be used in communications 332 and 336.

Subscriber flow 320 may push the data set, or subset of the data set, to one or more servers, located at one or more subscribers. The communication between subscriber flow 320 and server 326 may be shown at 338.

After a publication is published, the publication may only be transferred when required by a subscriber. As such, a publication may be retrieved by the data engine based on the subscriber's schedule.

Figure 4:
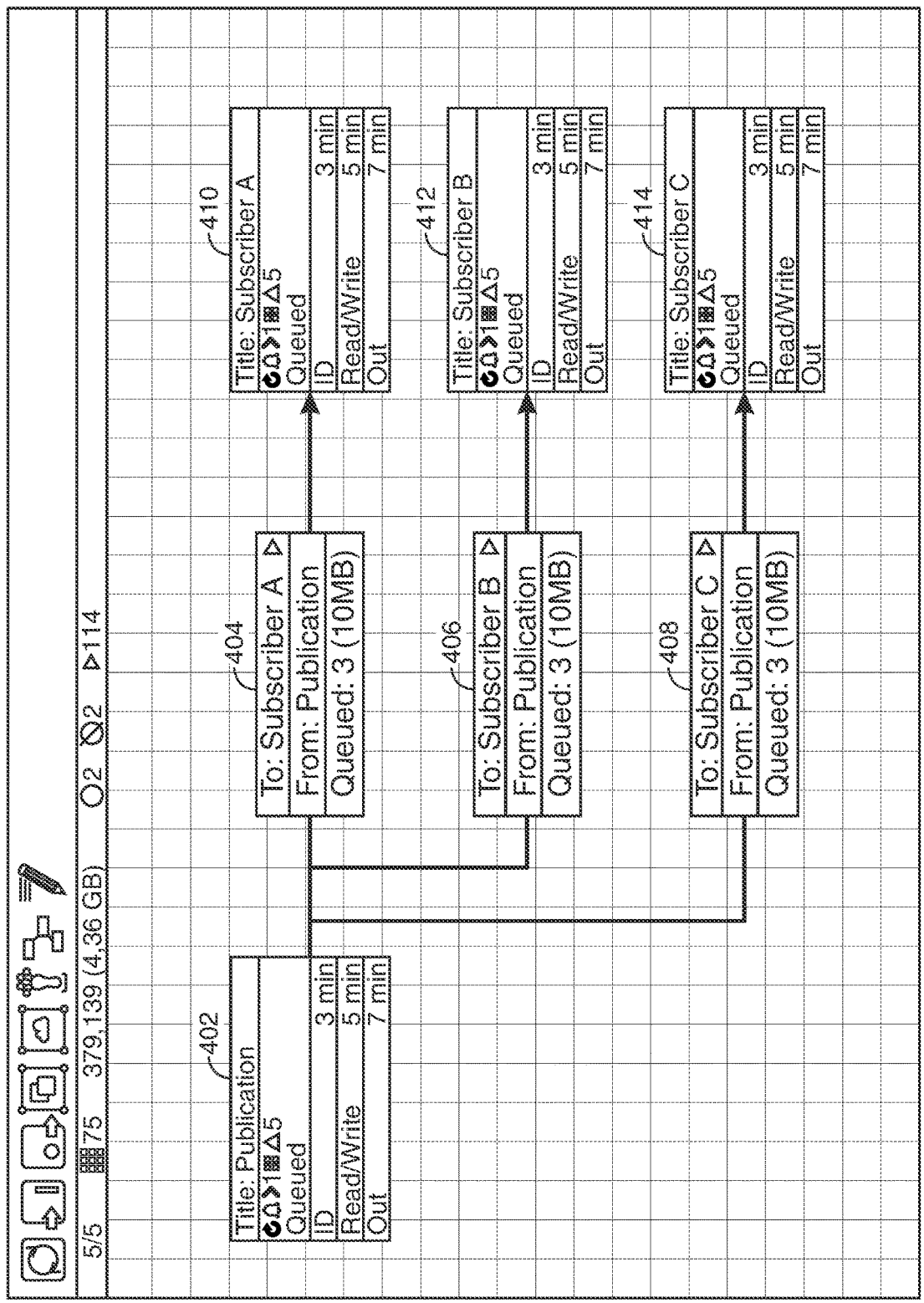
FIG. 4 shows yet another illustrative diagram in accordance with principles of the disclosure.

FIG. 4 shows an illustrative diagram. The illustrative diagram may include a publication pattern in an Apache Nifi™ data engine.

Subscriber A, subscriber B and subscriber C, shown at 410, 412 and 414 may subscribe to a publication 402.

Process 404 may link publication 402 and subscriber A (410). Process 406 may link publication 402 and subscriber B (412). Process 408 may link publication 402 and subscriber 414.

Publication 402 may be published on a predetermined schedule, such as once a week, once a month, on a predetermined day of the week or month, after a predetermined number of hours has lapsed, or on any other suitable schedule. Upon the publishing of publication 402, processes 404, 406 and 408 may transfer the data to subscriber A (410), subscriber B (412) and subscriber C (414). Each of processes 404, 406 and 408 may also customize publication 402 for their respective subscriber based on subscriber metadata. Each of the subscribers may receive and store the customized publication in a predetermined location. The predetermined location may also be based on subscriber metadata.

It should be appreciated that, Apache Nifi™ patterns may be publication-agnostic. Apache Nifi™ may generate a pattern, based on publication-agnostic patterns, when a publication is registered. The patterns may be updated with each subscription registration.

Figure 5:
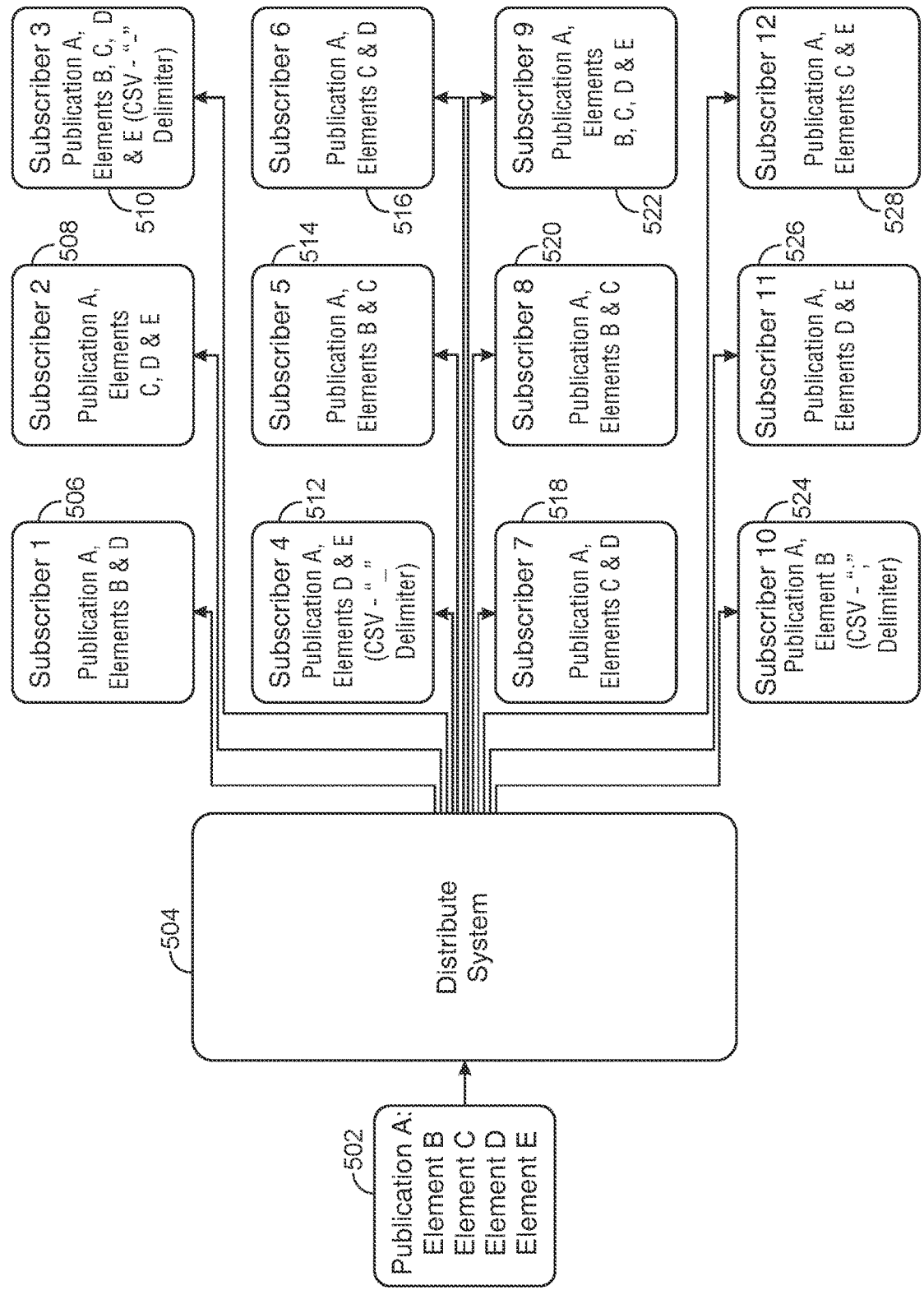
FIG. 5 shows still another illustrative diagram in accordance with principles of the disclosure.

FIG. 5 shows an illustrative diagram. Publisher A may be the publisher of publication A. Publication A may include elements B, C, D and E, as shown at 502. Publisher A may have registered publication A with distribute system 504. Each of subscribers 1-12, shown at 506-528 may have registered to receive publication A. Each of subscribers 1-12 may receive a customized version of publication A. It should be appreciated that publication A is published once and is received by multiple subscribers.

Subscriber 1, shown at 506, may receive elements B and D from publication A.

Subscriber 2, shown at 508, may receive elements C, D and E from publication A.

Subscriber 3, shown at 510, may receive elements B, C, D and E from publication A. Subscriber 3 may have selected to receive publication A in a comma separated value ("CSV") format using a hyphen delimiter.

Subscriber 4, shown at 512, may receive elements D and E from publication A. Subscriber 4 may have selected to receive publication A in a CSV format using an underscore delimiter.

Subscriber 5, shown at 514, may receive elements B and C from publication A.

Subscriber 6, shown at 516, may receive elements C and D from publication A.

Subscriber 7, shown at 518, may receive elements C and D from publication A.

Subscriber 8, shown at 520, may receive elements B and C from publication A.

Subscriber 9, shown at 522, may receive elements B, C, D and E from publication A.

Subscriber 10, shown at 524, may receive element B from publication A. Subscriber 10 may have selected to receive publication A in a CSV format using a semicolon delimiter.

Subscriber 11, shown at 526, may receive elements D and E from publication A.

Subscriber 12, shown at 528, may receive elements C and E from publication A.

Figure 6:
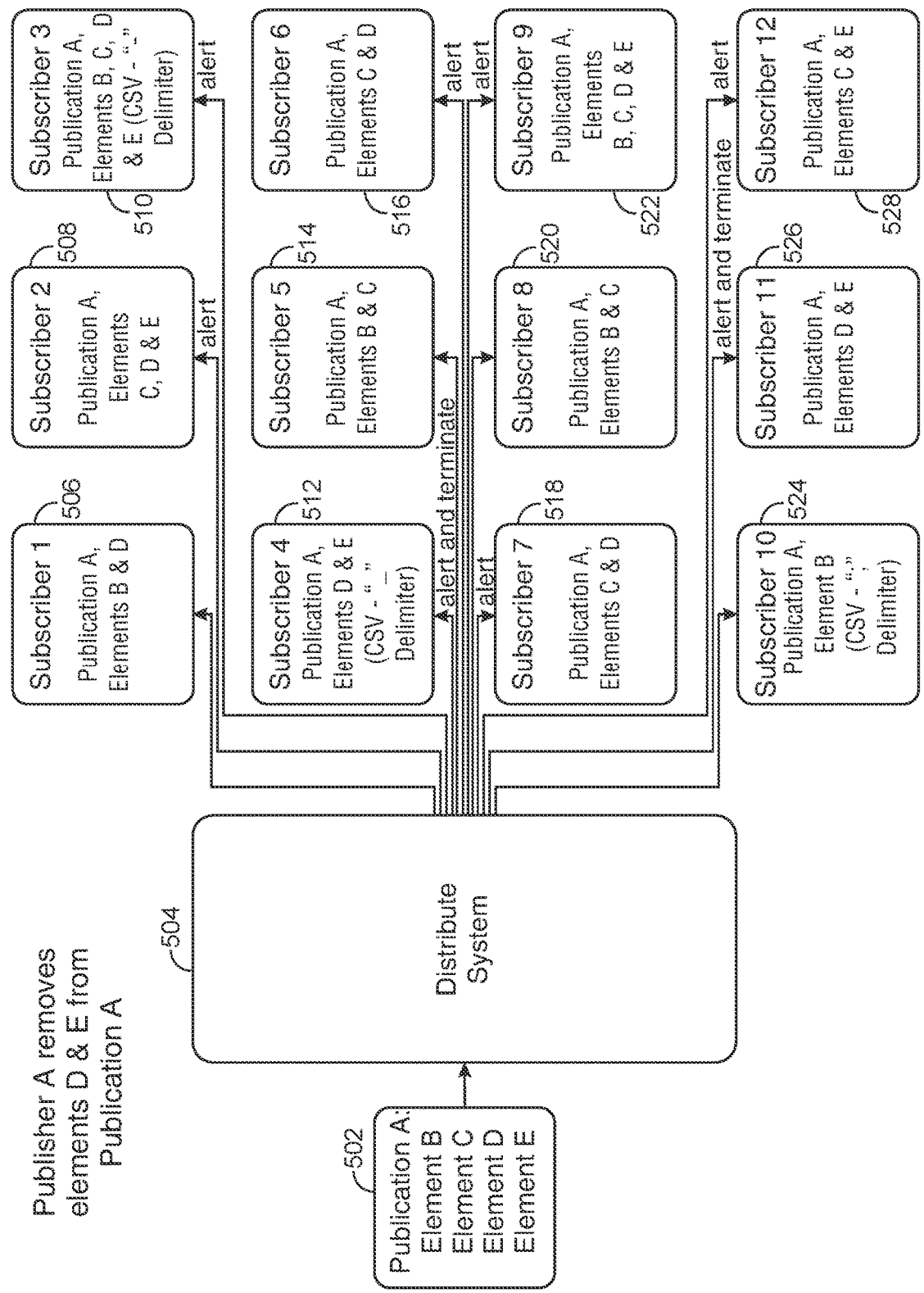
FIG. 6 shows yet another illustrative diagram in accordance with principles of the disclosure.

FIG. 6 publisher A removes elements D and E from publication A. As such, distribute system 504 determines subscribers that have received elements D and E. Distribute system 504 may transmit an alert to subscribers that have previously received elements D and E. As such, subscribers 2, 3, 4, 6, 7, 9, 11 and 12 may be alerted.

The alert may be an actionable alert. An actionable alert may enable the subscribers to respond to the alert. Such responses may include terminating the subscription. Such responses may include adding data elements to the subscription.

In the event that a subscription only included elements D and E, the subscription may be terminated. As such, the subscriptions being transmitted to subscriber 4 and subscriber 11 may be terminated.

Figure 7:
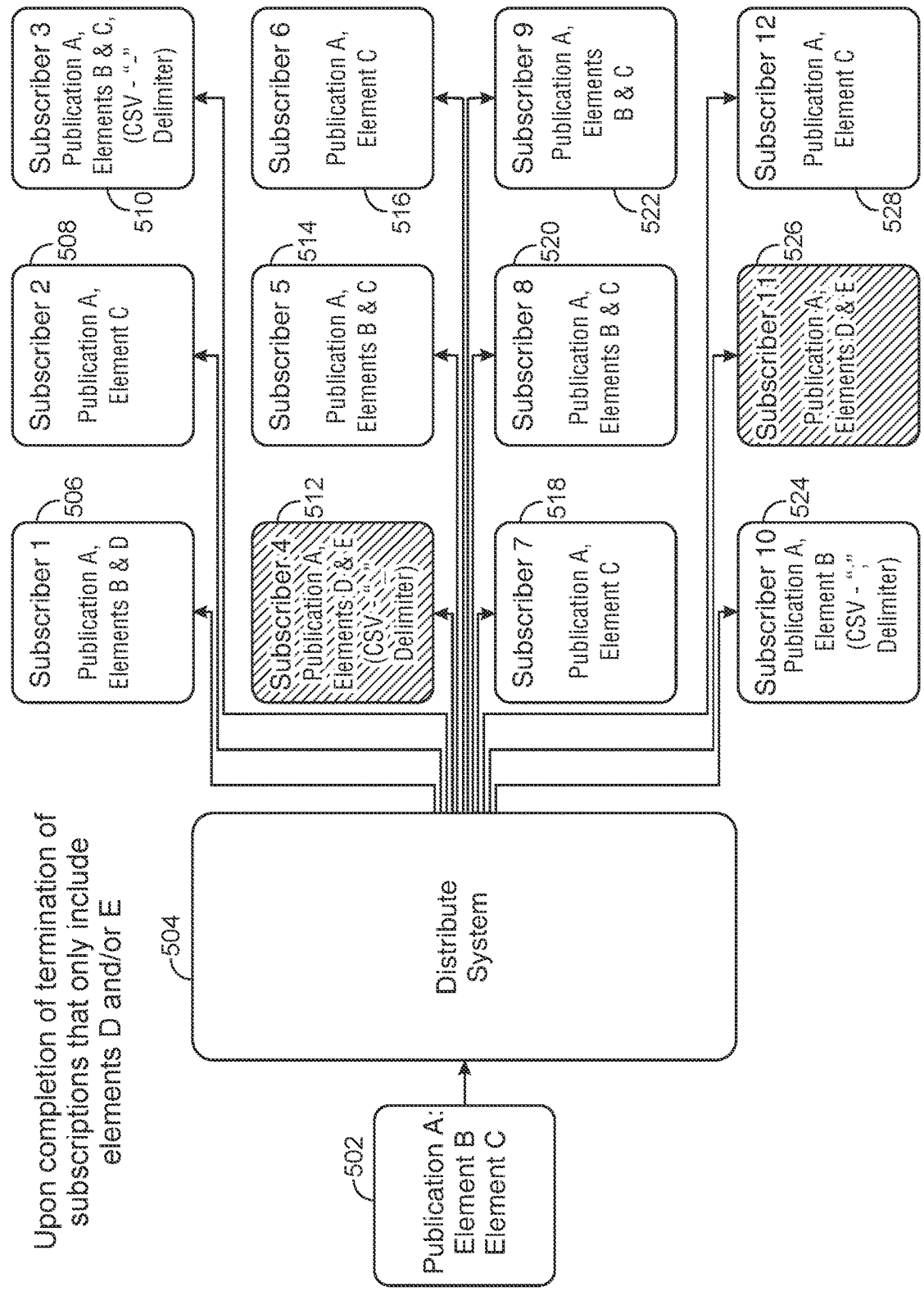
FIG. 7 shows still another illustrative diagram in accordance with principles of the disclosure.

FIG. 7 shows the completion of the termination of subscriptions that only include elements D and E. As shown, the subscriptions being transmitted to subscriber 4 and subscriber 11 may have been terminated.

Figure 8:
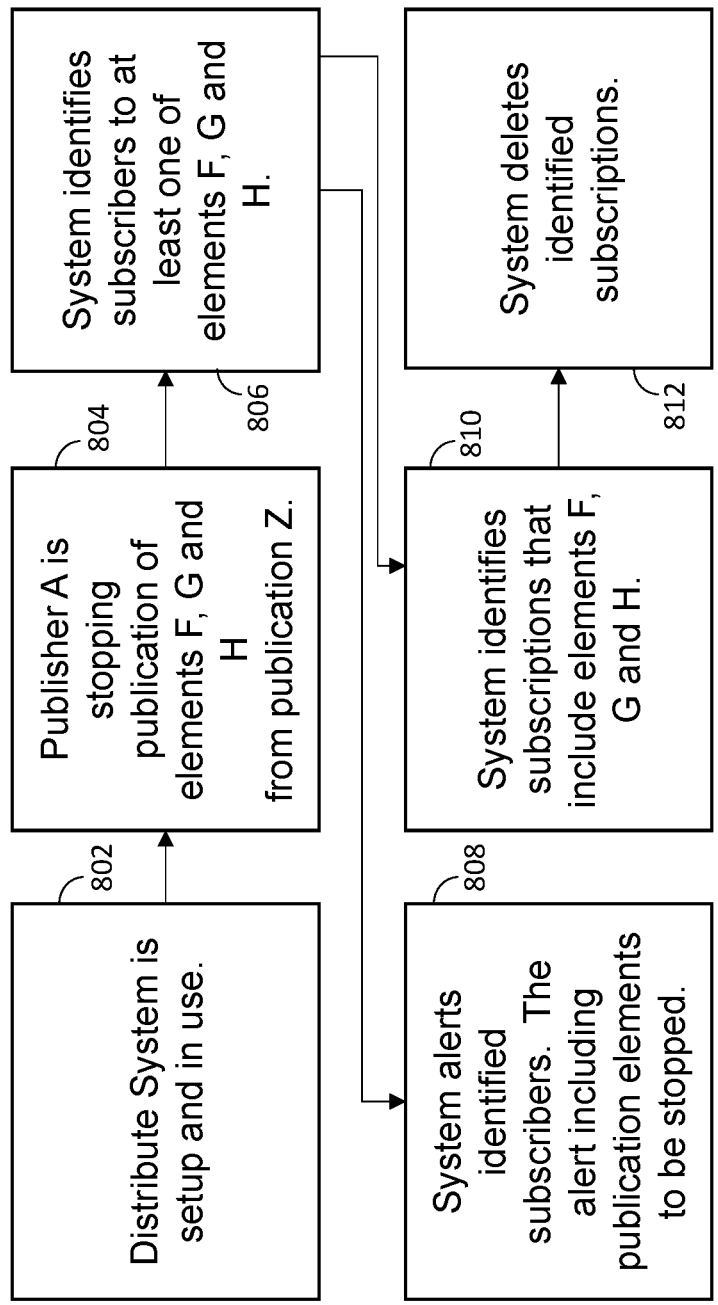
FIG. 8 shows an illustrative flow chart in accordance with principles of the disclosure.

FIG. 8 shows an illustrative flow chart. The illustrative flow chart may show the flow of deletion of publication elements. Step 802 shows that the distribute system is setup and in use. Step 804 shows that publisher A is stopping publication of elements F, G and H from publication Z.

Step 806 shows that the system identifies subscribers to at one of elements F, G and H. Step 806 may proceed to step 808 and/or 810. Step 808 shows that the system alerts the identified subscribers. The alert may include the publication elements to be stopped.

Step 810 shows that the system identifies subscriptions that include elements F, G and H. Step 812 shows that the system deletes the identified subscriptions.

Figure 9:
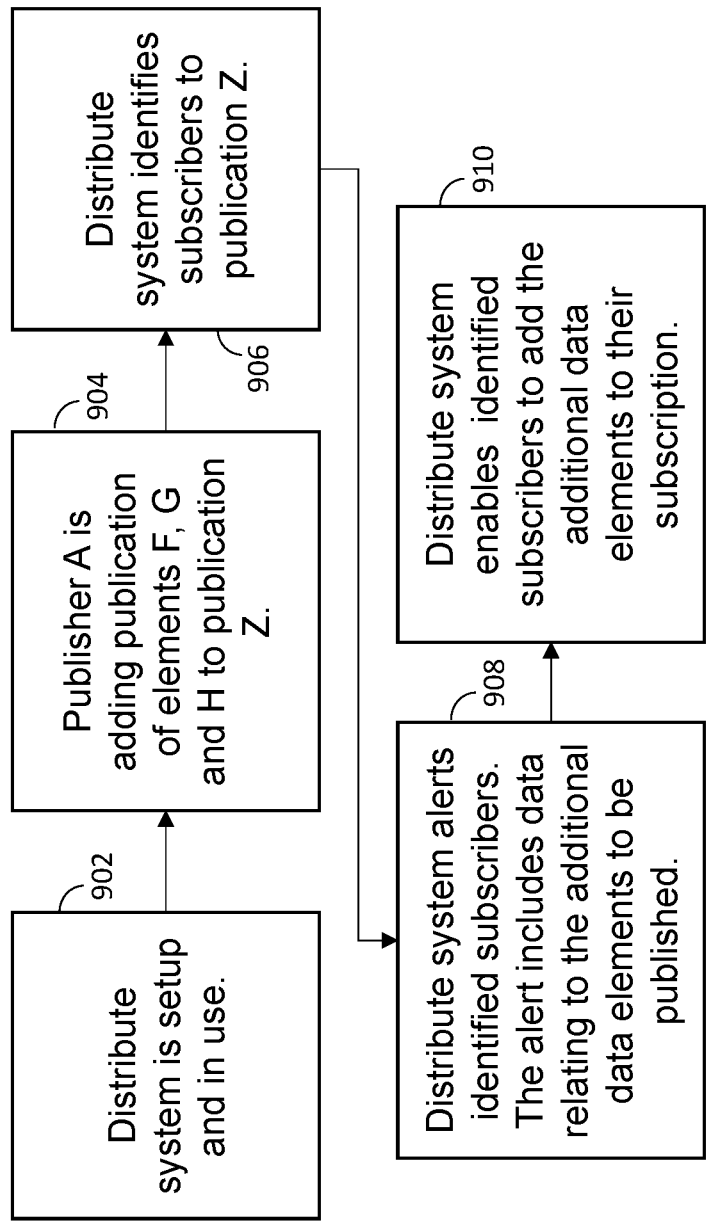
FIG. 9 shows another illustrative flow chart in accordance with principles of the disclosure.

FIG. 9 shows an illustrative flow chart. The illustrative flow chart may show the flow of addition of publication elements. Step 902 shows that the distribute system is setup and in use. Step 904 shows that publisher A is adding publication of elements F, G and H to publication Z. Step 906 shows that the distribute system identifies subscribers to publication Z.

Step 908 shows that the distribute system alert identified subscribers. The alert may include data relating to the additional data elements to be published. Step 910 shows that the distribute system enables the identified subscribers to add the additional data elements to their subscription.

Thus, a data set subscription tracking and termination system is provided. Persons skilled in the art will appreciate that the present invention can be practiced by other than the described embodiments, which are presented for purposes of illustration rather than of limitation. The present invention is limited only by the claims that follow.

What is claimed is:

1. A data set subscription tracking and termination system operating on a computer network, the system comprising:
   a distribute module operating on a processor, said distribute module comprising:
      a user interface;
      a distribute application programming interface, said distribute application programming interface communicates with the user interface;
      a distribute module database, said distribute module communicates with the distribute application programming interface, said distribute module database comprising:
         a metadata store;
      a data engine, said data engine comprising:
         a data engine application programming interface;
         a publisher flow application, said publisher flow application communicates with the data engine application programming interface; and
         a subscriber flow application, said subscriber flow application communicates with the publisher flow application;
   a publisher comprising:
      a job scheduler, said job scheduler publishes a publication; and
      a publisher datastore, said publisher datastore comprising the publication;
   a subscriber comprising:
      a subscriber server, said subscriber server receives the publication;
   wherein:
      the publisher transmits a message to the distribute application programming interface, said message relating to the publication, said message comprising one or more rows and/or columns to be added to the publication;
      the distribute application programming interface retrieves from the metadata store included in the distribute module database:
         publisher metadata relating to publication; and
         subscriber metadata relating to the subscriber; and
      the distribute application programming interface generates, and transmits, an alert to the subscriber, said alert comprising the one or more rows and/or columns to be added to the publication.

2. The system of claim 1, wherein the distribute application programming interface transmits the alert to the data engine application programming interface.

3. The system of claim 2, wherein the data engine application programming interface transmits the alert to the subscriber flow application.

4. The system of claim 3, wherein the subscriber flow application transmits the alert to the subscriber.

5. The system of claim 4, wherein the alert comprises a selectable option to select one or more of the one or more rows and/or columns to be added to the publication.

6. The system of claim 5, wherein, upon selection, by the subscriber, of the selectable option to select one or more of the one or more rows and/or columns to be added to the publication, the subscriber transmits the alert that comprises the selected selectable option to the distribute module database, via the subscriber flow application, the data engine application programming interface and the distribute application programming interface.

7. The system of claim 6, wherein the distribute module database stores the selection of the subscriber within the subscriber metadata in the metadata store.

8. The system of claim 7, wherein:
the job scheduler triggers the publishing of the publication by calling an endpoint on the distribute application programming interface, the calling comprises transmitting a unique identifier generated for the publication from the job scheduler to the distribute application programming interface,
the distribute application programming interface retrieves from the metadata store included in the distribute module database:
the publisher metadata relating to the publication, said publisher metadata comprising location of publication; and
the subscriber metadata relating to the subscriber;
the distribute application programming interface combines the publisher metadata and the subscriber metadata into one metadata payload;
the distribute application programming interface transmits the one metadata payload to the data engine application programming interface;
the data engine application programming interfaces transmits the one metadata payload to the publisher flow application;
the publisher flow application retrieves the publication, based on the one metadata payload, from the publisher datastore;
the publisher flow application transmits the retrieved publication and the one metadata payload to the subscriber flow application;
the subscriber flow application filters the publication based on the subscriber metadata included in the one metadata payload; and
the subscriber flow application transmits the filtered publication to the subscriber server.

9. A data set subscription tracking and termination system operating on a computer network, the system comprising:
a distribute module operating on a processor, said distribute module comprising:
a user interface;
a distribute application programming interface, said distribute application programming interface communicates with the user interface;
a distribute module database, said distribute module database communicates with the distribute application programming interface, said distribute module database comprising:
a metadata store;
a data engine, said data engine comprising:
a data engine application programming interface;
a publisher flow application, said publisher flow application communicates with the data engine application programming interface; and
a subscriber flow application, said subscriber flow application communicates with the publisher flow application;
a publisher comprising:
a job scheduler, said job scheduler publishes a publication; and
a publisher datastore, said publisher datastore comprising the publication;
a plurality of subscribers, each subscriber, included in the plurality of subscribers, comprising:
a subscriber server, said subscriber server receives a predetermined subset of the publication, said predetermined subset specified by the subscriber;
wherein:
the publisher transmits a message to the distribute application programming interface, said message relating to the publication, said message comprising one or more data elements to be removed from the publication;
the distribute application programming interface retrieves from the metadata store included in the distribute module database:
subscriber metadata, said subscriber metadata comprising:
the plurality of subscribers; and
for each of the subscribers included in the plurality of subscribers, metadata relating to the predetermined subset of the publication;
the distribute application programming interface determines one or more subscribers, included in the plurality of subscribers, for which the predetermined subset of the publication includes the metadata elements to be removed from the publication; and
the distribute application programming interface transmits an alert to the determined subscribers, said alert comprising the metadata elements to be removed from the publication.

10. The system of claim 9, wherein, the distribute application programming interface further determines, from the determined subscribers, a subset of subscribers that are associated with subscriber metadata that include a second predetermined subset of the publication, said second predetermined subset of the publication only comprising the metadata elements to be removed from the publication.

11. The system of claim 10, wherein, the distribute application programming interface deletes the subscriber metadata for each subscriber included in the subset of subscribers.

12. The system of claim 11, wherein, the distribute application programming interface terminates transmission of the publication to the subset of subscribers.

13. The system of claim 9, wherein the alert is transmitted to the determined subscribers via a dashboard.

* * * * *